(12) United States Patent
York

(10) Patent No.: US 6,545,383 B1
(45) Date of Patent: Apr. 8, 2003

(54) HIGH EFFICIENCY ROTOR FOR ELECTROMECHANICAL MACHINES

(75) Inventor: Michael Timothy York, Chelsea, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/731,151

(22) Filed: Dec. 5, 2000

(51) Int. Cl.[7] ................................................ H02K 1/22
(52) U.S. Cl. .......................................... 310/263; 310/42
(58) Field of Search .......................... 310/42, 254, 261, 310/263, 268, 269, 216, 105; 29/596–598

(56) References Cited

U.S. PATENT DOCUMENTS 3,571,637 A    3/1971   Henningsen
4,228,377 A   10/1980   Kreuzer
5,768,763 A    6/1998   Nobuyuki et al.
5,903,083 A    5/1999   Mukai et al.
6,023,119 A    2/2000   Asao
6,229,243 B1 * 5/2001   Roesel, Jr. et al. .......... 310/261

FOREIGN PATENT DOCUMENTS

JP    3-139149  *  6/1991  .................. 310/263
JP    5-83909   *  4/1993  .................. 310/263

* cited by examiner

Primary Examiner—Tran Nguyen
(74) Attorney, Agent, or Firm—Frank L. Lollo

(57) ABSTRACT

A rotor assembly for an electromechanical machine includes iron rotor pole pieces containing a plurality of finger claws each having an exterior face about the circumference of the rotor assembly. Indentations are produced on the surface of each exterior face so as to form a plurality of closed surface areas. The closed surface areas restrict the travel of and confine the eddy currents to small surface areas thereby reducing the efficiency losses due to eddy currents.

7 Claims, 5 Drawing Sheets

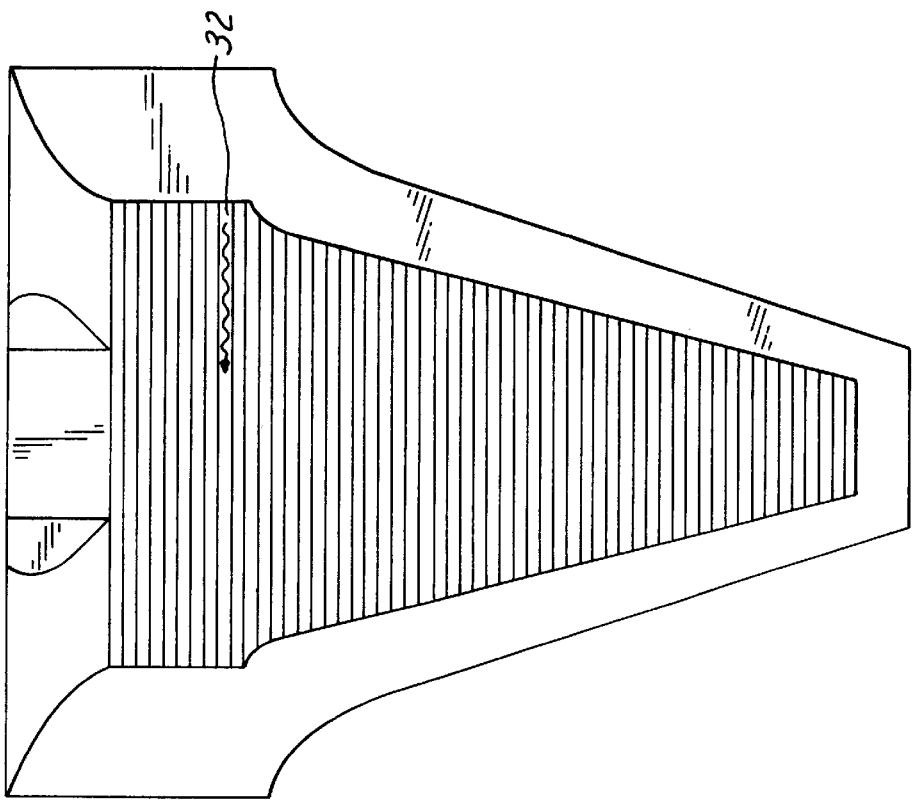
(PRIOR ART) FIG.4
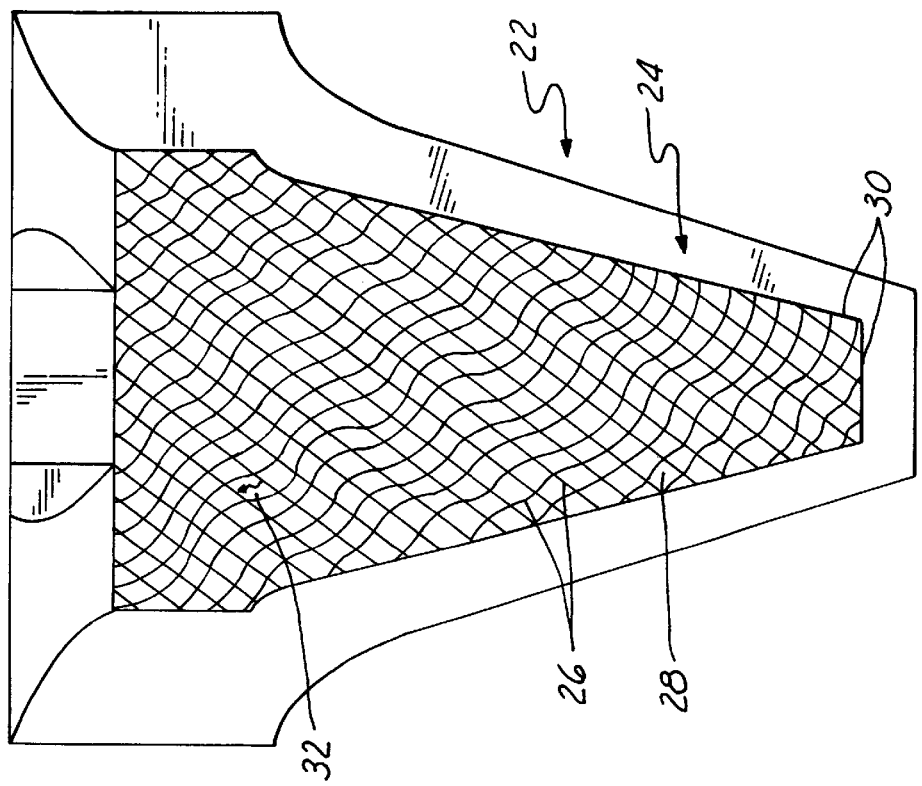
FIG.3C

HIGH EFFICIENCY ROTOR FOR ELECTROMECHANICAL MACHINES

TECHNICAL FIELD

This invention relates to a rotor for an electromechanical machine. More particularly, the invention is directed to the exterior faces of a rotor pole piece which are segmented so as to reduce the eddy currents generated by the rotor.

BACKGROUND

One type of known electromechanical machine is of a Lundell type rotor comprising a rotor shaft, two iron pole pieces, a fan, slip rings, and a rotor coil. Many Lundell type rotors are used in automobiles to generate the magnetic field within an alternator. The alternator generates electrical power for the various components utilized by the automobile. However, since the alternator is driven by the engine, it has a substantial impact on fuel economy. The average efficiency of a conventional Lundell style alternator is less than 60%. It is therefore critical and strategic to alternator and automobile manufacturers to develop innovative ways to improve alternator efficiency for increasing the fuel economy.

In order to improve the efficiency of any electrical machine it is necessary to reduce the losses within the machines. The losses can generally be categorized as either mechanical, electrical, or core losses. Core losses consist of both eddy current losses and hysteresis losses. Eddy currents are generated from the cyclic magnetization within the iron of the magnetic circuit creating parasitic currents resulting in lost energy dissipated through heat. Eddy currents are generated in both the stator core and the rotor pole finger faces.

The stator generally has the greatest potential to have excessive eddy currents since the rotor is providing each stator tooth with a pulsating north and south magnetic field as it rotates past each tooth. Therefore, the stator is typically laminated to separate the body of the stator core into thin layers that reduce the cross sectional area in the core in which the eddy currents flow. This results in the eddy currents being confined within small areas reducing the net effect on heat generated. This is due to the small areas yielding less variation in flux density within the area than larger areas. The eddy currents are governed by the equation V=IR and V=N(dp/dt) where N=1 in a solid section of iron. In addition, with the known fact that the power loss can be described as P=I^2R it can be seen that smaller areas yield smaller currents resulting in lower losses since the current term is squared in the power loss equation.

The rotor's field is generally DC and therefore does not produce a varying magnetic field. However, on the surface of the poles the magnetic field is varying as the rotor is rotated due to the permanence of each stator tooth passing by and the emf produced by currents flowing in the stator windings that affect the field from the rotor. This results in a cyclic time varying magnetic field density on the surface of the pole fingers leading to eddy current losses on the pole face. The loss results in excessive heating of the pole face reducing alternator efficiency.

The prior art discloses rotors with Lundell type cores, including rotor pole units with pole claws that have spiral grooves on the outer circumference of the exterior surface of each pole claw. The grooves are formed parallel to one another at equal intervals from the tip of the exterior face of the pole claw to the base of the pole claw in a spiral pattern. The methods for producing the grooves employ conventional finish outer diameter machining. The spiral grooves are partially effective in reducing the eddy currents generated on the pole claw, however, the eddy currents are still allowed to run between the grooves the entire cross-width of the pole face.

SUMMARY OF THE INVENTION

Consonant with the present invention, a rotor assembly for an electromechanical machine which reduces the eddy currents generated on the exterior faces of the rotor pole pieces and increases the overall efficiency of the electromechanical machine, which is simple and inexpensive to manufacture, has surprisingly been discovered. The rotor assembly comprises a rotor pole piece having a material composition substantially of iron. A plurality of finger claws are positioned as part the rotor pole piece on the outer circumference of the rotor pole. On the outer surface of each finger claw is an exterior face. Indentations are produced on the surface of the exterior face forming a plurality of closed surface areas. The closed surface areas reduce the eddy currents generated in the rotor assembly for an electromechanical machine thereby increasing the overall efficiency of the machine.

BRIEF DESCRIPTION OF THE DRAWINGS

A more complete appreciation of the present invention and many of its advantages will be readily obtained as they become better understood by reference to the following detailed description when considered in connection with the accompanying drawings and detailed specification.

FIG. 3c is a front view of a finger claw of the pole pieces with a combination linear and nonlinear pattern of indentations on an exterior face.

FIG. 4 is a front view of a finger claw of the pole pieces with a spiral pattern of indentations on an exterior face as known in the prior art.

DESCRIPTION OF THE PREFERRED EMBODIMENTS(S)

Figure 1:
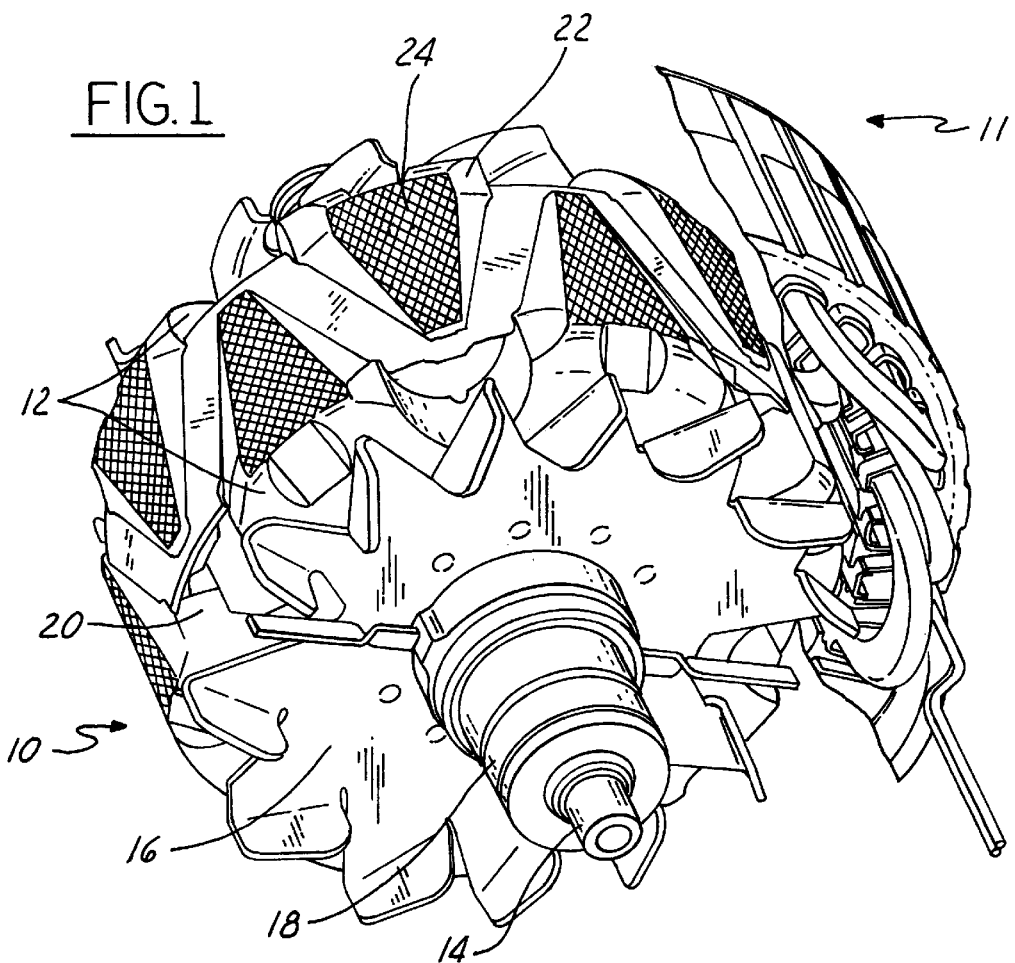
FIG. 1 is a perspective view of a rotor assembly embodying the features of the present invention.

Referring now to the Drawings and particularly to FIG. 1, a rotor assembly 10 is an electromechanical rotor comprising a set of iron pole pieces 12 that are secured to a shaft 14. The pole pieces 12 oppose each other and encase a rotor coil 20 which is also known as a field coil which is used for generating the magnetic flux when an electrical current is passed therein. Slip rings 18 which are brush-contacted ring electrodes are secured to one end of the shaft 14 for supplying electrical current to the rotor. Fans 16 are secured to each side of the pole pieces 12 to assist in cooling the electromechanical machine. FIG. 1 also shows a stator 11. The stator 11 is positioned in an alternator housing (not shown) adjacent to the circumference of rotor assembly 10.

Figure 2:
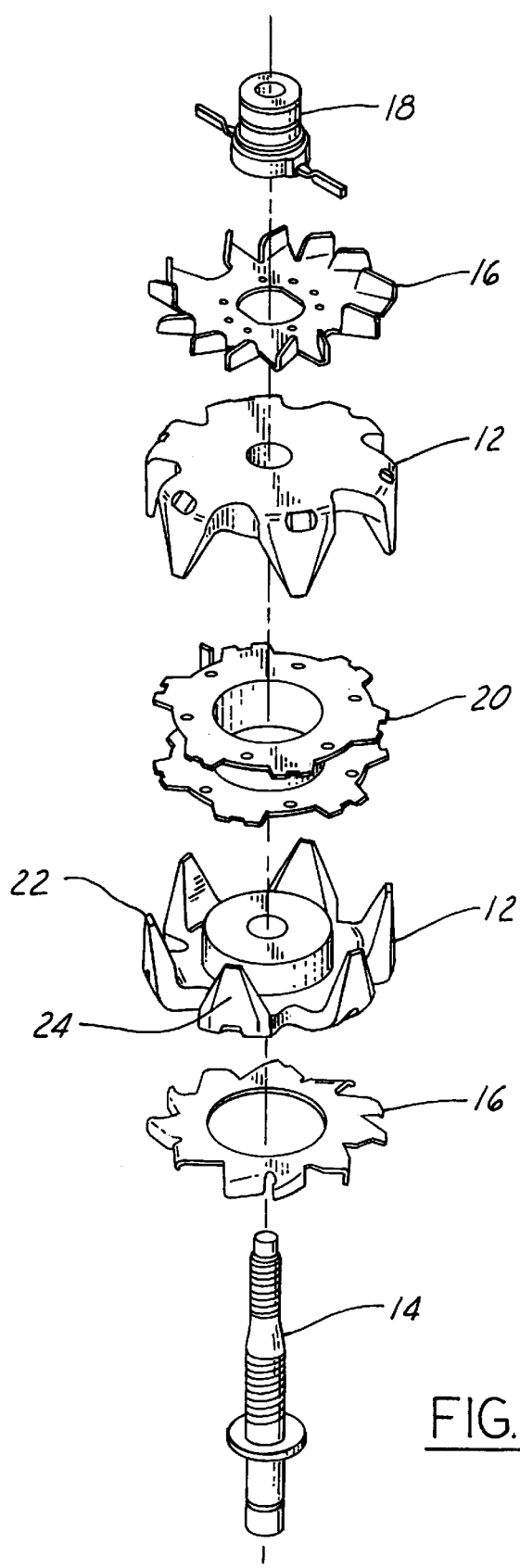
FIG. 2 is an exploded, perspective view of the rotor assembly portraying the iron pole pieces of the rotor.

FIG. 2 illustrates an expanded view of the rotor assembly 10 according to the present invention, comprising a finger claw 22, and an exterior face 24. The pole piece 12 has a material composition of iron. The finger claw 22 is an axial projection on the outer circumference of pole piece 12. The finger claws 22 of one pole piece 12 are positioned between the finger claws 22 of the other opposing pole piece 12 so as to interweave the two sets of finger claws 22 about the circumference of the rotor assembly 10 as shown in FIG. 1.

Figure 3B:
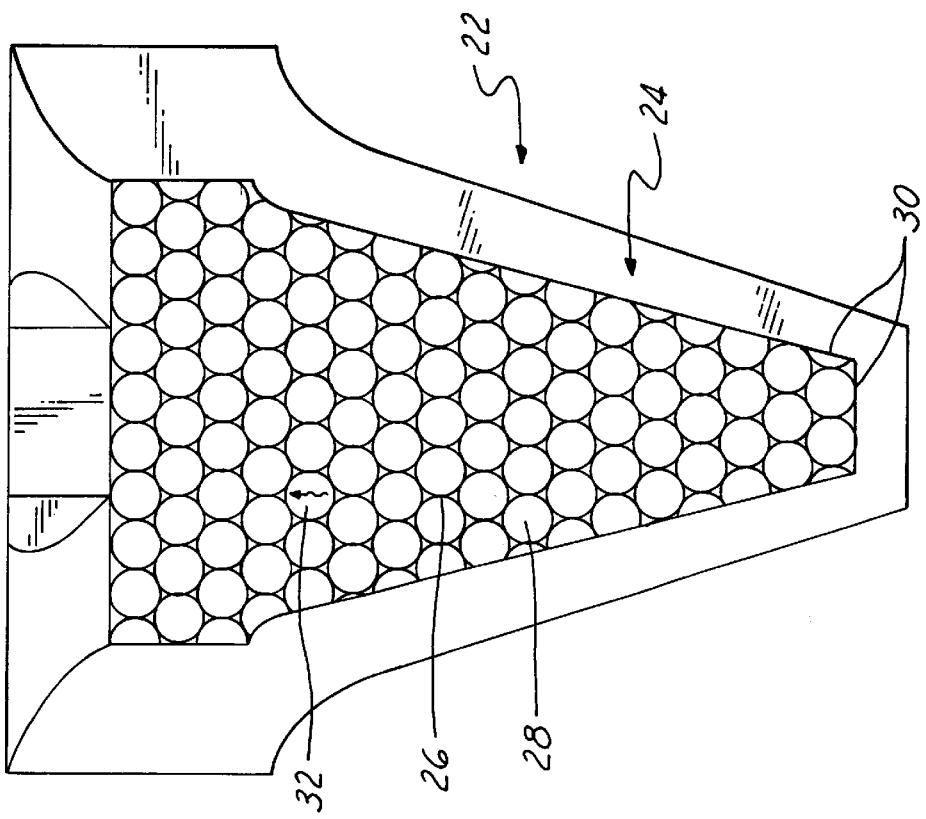
FIG. 3b is a front view of a finger claw of the pole pieces with a circular pattern of indentations on an exterior face.
Figure 3A:
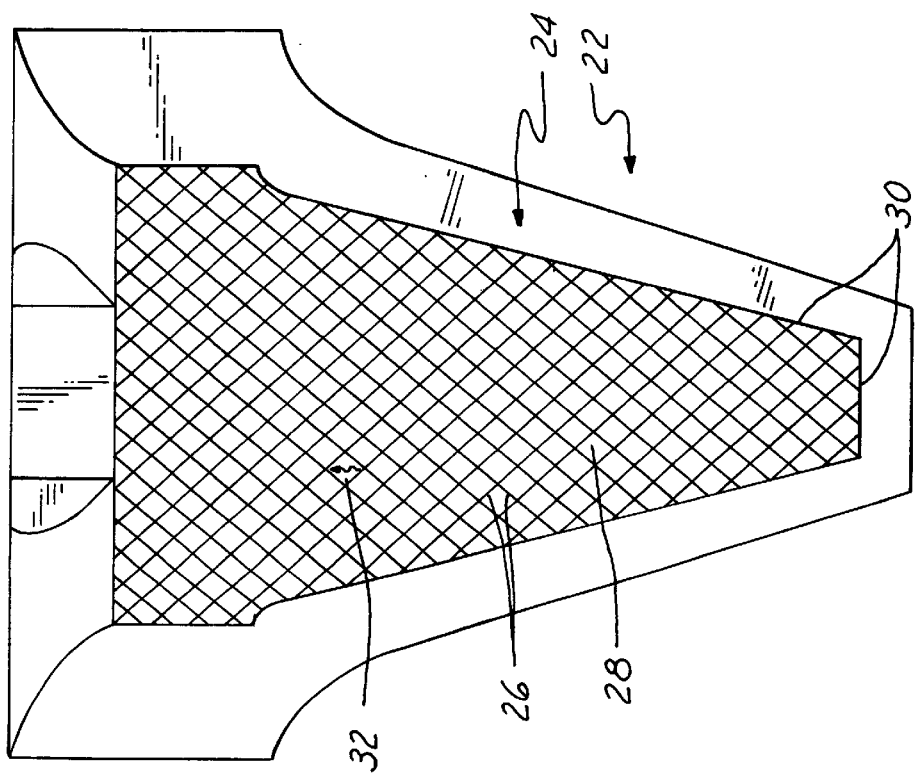
FIG. 3a is a front view of a finger claw of the pole pieces with a crosshatch pattern of indentations on an exterior face.

FIG. 3a illustrates a preferred embodiment of the finger claw 22 and the exterior face 24 on the circumference surface of each finger claw 22. This surface can be curved or flat. Formed within the boundaries of the exterior face 24 is a pattern of lines 26 in the form of indentations which are produced on the surface. A pattern of lines 26 which can be linear, nonlinear, or the combination of linear and nonlinear, and form a plurality of closed surface areas 28 that comprise the shapes of but are not limited to circles, ovals, rectangles, squares, trapezoids, parallelograms, triangles, and polygons of greater than four sides. FIG. 3a illustrates a pattern of lines that are linear and form a square or parallelogram. FIG. 3b shows a configuration where the closed surface areas 28 are produced by the indention of a pattern of circles. FIG. 3c illustrates a pattern of lines that comprises both linear and nonlinear lines whereby the linear lines intersect the nonlinear lines to form the closed surface area 28. Since the closed surface areas 28 can basically achieve the form and size of any shape and pattern, eddy currents 32 are broken up into much smaller segments than the conventional spiral pattern. To avoid the eddy currents 32 from running the entire length of the exterior face 24, as in the spiral method depicted in FIG. 4, any pattern of lines 26 used, as in FIGS. 3a, 3b, 3c, are such that each cross dimension 30 of the exterior face 24 is broken by at least one indented line. This assures that even if a spiral pattern is used, then the surface area that the eddy currents 32 are generated on will be minimized to less than the entire cross-width or cross-length of the exterior face 24. Consequently, the more closed surface areas 28 produced on the exterior face 24 the smaller the actual surface area that the eddy currents 32 will be confined to and as a result will yield lower currents. Accordingly, the power losses will be reduced and the overall efficiency of the electromechanical device will be increased.

Figure 5:
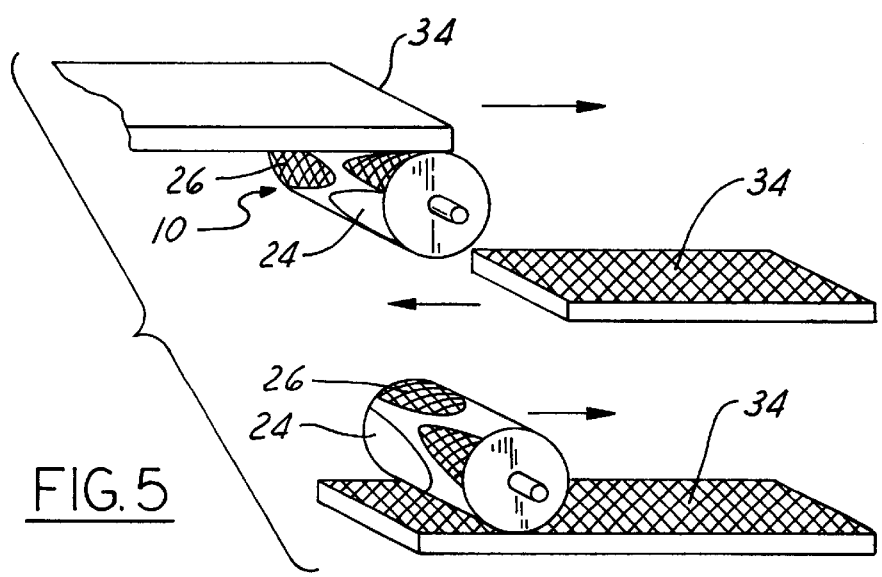
FIG. 5 is a diagrammic view illustrating a knurling process useful in the present invention.
Figure 6:
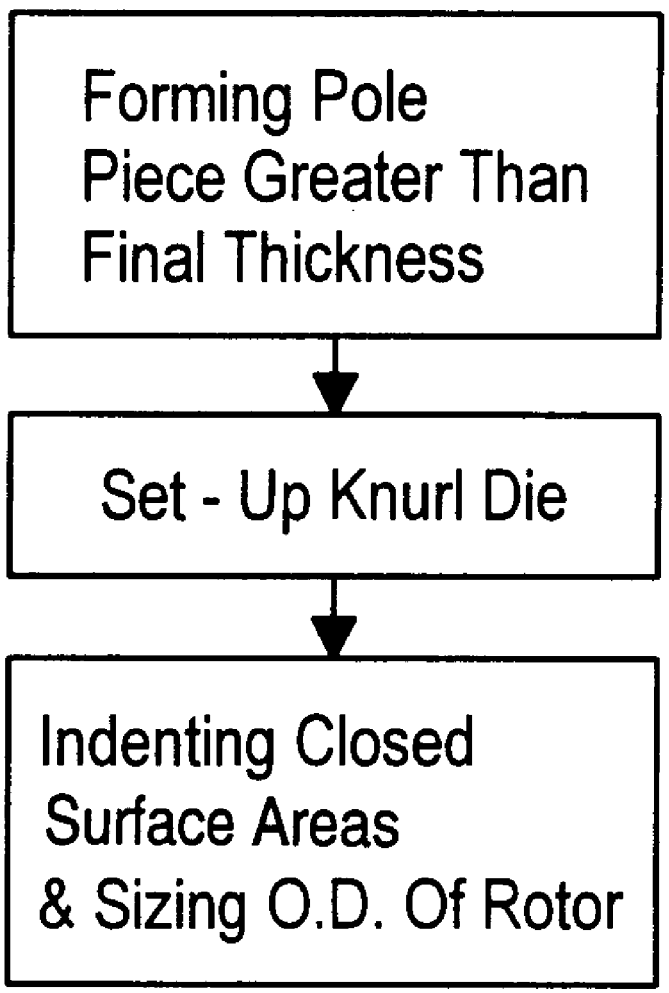
FIG. 6 is a flow diagram showing a method of forming the pole piece and the indentations of the embodied invention.

FIG. 5 illustrates a process in which knurling is used to create the indentation of the pattern of lines 26 on the exterior face 24 of the rotor assembly 10. Knurling involves the rolling of a die 34 across the exterior face 24 so as to make the indentations or impressions below the surface. Knurling offers many advantages in that virtually any pattern can be utilized since the pattern only has to be reproduced for a set of knurling dies used for thousands of parts, whereas machining limits the design to the spiral cut for mass production machines. Because knurling involves a rolling of the die over the material composition to make the indentations, this process is a very fast and cost efficient method as opposed to machining or some other type of cutting method. Furthermore, knurling can be used to size the outer diameter of the rotor to very tight tolerances thereby eliminating any need for a separate finish machining process. As shown in FIG. 6, one method is to form a pole piece greater than the final thickness of the diameter required. A knurling die containing the desired pattern is selected. The die is then rolled over the rotor producing an indentation of lines forming closed surface areas and simultaneously sizing the outer diameter of the rotor assembly.

From the foregoing description, one ordinarily skilled in the art can easily ascertain the essential characteristics of this invention and, without departing from the spirit and scope thereof, can make various changes and modifications to the invention to adapt it to various usages and conditions. For example, although only one process is shown to make the indentions on the surface of the exterior face 24, it will be readily apparent to those skilled in the art to utilize a process such as laser etching or chemical etching to achieve the various designs as discussed above.

What is claimed is:

1. A rotor for a rotary electric machine, said rotor comprising a substantially iron pole piece containing a plurality of finger claws, wherein each of the finger claws has a respective exterior face and each exterior face is indented with a pattern of lines forming a plurality of closed surface areas such that each crosswise dimension of each exterior face is broken by at least one indented line, wherein the pattern of lines break up eddy currents paths and confine eddy currents to said closed surface areas.

2. The rotor of claim 1, wherein said closed surface areas each have a geometrical shape selected from a group consisting of a circle, oval, rectangle, square, triangle, and polygon of greater than four sides.

3. The rotor of claim 1 wherein said closed surface areas each comprise linear shapes.

4. The rotor of claim 1 wherein said closed surface areas each comprise non-linear shapes.

5. The rotor of claim 1 wherein said closed surface areas comprise of both linear and non-linear shapes.

6. The rotor of claim 1 wherein said indented pattern of lines is formed by knurling, chemical etching, or laser etching.

7. A rotary electric machine comprising a stator including a cylindrical laminated core positioned in a housing having a winding carried by the stator core to generate an electrical alternating current;

a rotor mounted for rotation adjacent to said stator, said rotor comprising a pair of iron pole pieces each containing a plurality of finger claws wherein each finger claw has a respective exterior face and each exterior face is indented with a pattern of lines forming a plurality of closed surface areas such that each crosswise dimension of each exterior face is broken by at least one indented line, whereby said closed surface areas break up eddy current paths and confine eddy currents to said closed surface areas.

* * * * *